(12) United States Patent
Wang

(10) Patent No.: US 7,370,644 B2
(45) Date of Patent: May 13, 2008

(54) EGR CONTROL APPARATUS AND METHOD FOR OPERATING THE SAME

(75) Inventor: Xiumei Wang, Kariya (JP)

(73) Assignee: Denso Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/421,506

(22) Filed: Jun. 1, 2006

(65) Prior Publication Data

US 2006/0272625 A1     Dec. 7, 2006

(30) Foreign Application Priority Data

Jun. 2, 2005    (JP)    ............................. 2005-162860

(51) Int. Cl.
  *F02M 25/07*    (2006.01)
  *F02B 47/08*    (2006.01)
  *F02B 33/44*    (2006.01)

(52) U.S. Cl. .......................... 123/568.12; 123/568.16; 60/605.2

(58) Field of Classification Search ........... 123/568.11, 123/568.12, 568.16, 568.21; 165/303; 134/102.2, 134/169 A; 251/129.11, 129.12, 129.15; 701/108; 60/605.2
See application file for complete search history.

(56) References Cited

U.S. PATENT DOCUMENTS

| | | | |
|---|---|---|---|
| 4,378,777 A | 4/1983 | Iida et al. | |
| 5,666,932 A | 9/1997 | Bauerle et al. | |
| 5,769,390 A * | 6/1998 | Ando | 251/129.11 |
| 6,212,881 B1 | 4/2001 | Takahashi et al. | |
| 6,474,319 B1 * | 11/2002 | Hough et al. | 123/568.11 |
| 6,478,036 B1 * | 11/2002 | Connors et al. | 134/102.2 |
| 7,281,529 B2 * | 10/2007 | Lew et al. | 123/568.12 |

FOREIGN PATENT DOCUMENTS

| | | |
|---|---|---|
| EP | 1420158 A2 | 11/2003 |
| FR | 2833653 | 12/2001 |
| JP | 57-62954 | 4/1982 |
| JP | 2003-314377 | 11/2003 |
| KR | 2003-15486 | 2/2003 |

OTHER PUBLICATIONS

European Search Report dated Sep. 20, 2006.
Korean Office Action dated Oct. 5, 2007 corresponding to Korean application No. 10-2006-0049157.
Examination Report dated Nov. 23, 2007 in CN Application No. 2006100877729 with English translation.

* cited by examiner

*Primary Examiner*—Willis R. Wolfe, Jr.
(74) *Attorney, Agent, or Firm*—Nixon & Vanderhye P.C.

(57) ABSTRACT

An ECU calculates a foreign-matter accumulation index base on a total flow rate of EGR gas integrated since the previous execution of a last foreign-matter removal operation until the present execution of the foreign-matter removal operation. The ECU controls an actuator for operating an EGR valve and a number of the actuations of the EGR valve on the basis of the foreign-matter accumulation index. When the total flow rate of the EGR gas increases, the quantity of foreign matters contained in EGR gas correspondingly increases. Therefore, as the foreign-matter accumulation index becomes larger, the actuation intensity of the EGR valve is set higher and the number of the actuations of the EGR valve is set larger. As a result, the removal operation of foreign matters can be efficiently executed in accordance with the deposition intensity or the deposition quantity of foreign matters.

15 Claims, 4 Drawing Sheets

EGR CONTROL APPARATUS AND METHOD FOR OPERATING THE SAME

CROSS REFERENCE TO RELATED APPLICATIONS

This application is based on and incorporates herein by reference Japanese Patent Application No. 2005-162860 filed on Jun. 2, 2005.

FIELD OF THE INVENTION

The present invention relates to an EGR control apparatus for an internal combustion engine, and relates to a method for operating the EGR control apparatus.

BACKGROUND OF THE INVENTION

Heretofore, an exhaust gas recirculation (EGR) is performed in a diesel engine, for example. Specifically, exhaust gas is partially recirculated into intake pipe in order to reduce nitrogen oxides (NOx) contained in exhaust gas. However, exhaust gas contains unburned fuel, engine oil, soot, and the like, in addition to gaseous substances such as the NOx. When these components are deposited and solidified on the inwall surface of an EGR passage, an operation of an EGR valve may be disturbed.

For example, according to JP-A-2003-314377, an EGR valve is actuated when a diesel engine stops, thereby removing foreign matters deposited on the inwall surface of the EGR passage.

However, in this disclosure, the EGR valve is actuated for a predetermined number and at a predetermined intensity, irrespective of an extent of the deposition of foreign matters such as a deposition quantity and a deposition intensity. Accordingly, it is difficult to efficiently remove foreign matters. Specifically, when the deposition quantity of foreign matters is small or when the deposition intensity thereof is low, the number of the actuations of the EGR valve and the intensity of the actuations are unnecessarily afforded, and hence, a wasteful energy consumption increases. To the contrary, when the deposition quantity of foreign matters is large or when the deposition intensity thereof is high, the number of the actuations of the EGR valve and the intensity of the actuations become insufficient, and hence, foreign matters are left behind without being sufficiently removed.

SUMMARY OF THE INVENTION

The present invention addresses the above disadvantage.

According to one aspect of the present invention, an EGR control apparatus is used for an internal combustion engine having a suction passage, an exhaust passage, and an EGR passage. The EGR passage connects the suction passage with exhaust passage. The EGR control apparatus includes an EGR valve that is disposed in the EGR passage for regulating a flow rate of EGR gas flowing from the exhaust passage to the suction passage through the EGR passage. The EGR control apparatus further includes a control unit that includes a removal unit, which is adapted to executing a foreign-matter removal operation by controlling the EGR valve in order to remove foreign matters deposited on an inwall surface of the EGR passage. The control unit further includes a deposition detecting unit that detects at least one of a deposition intensity of foreign matters deposited on the inwall surface of the EGR passage and a deposition quantity of foreign matters deposited on the inwall surface of the EGR passage. The removal unit controls the EGR valve in accordance with the at least one of the deposition intensity and the deposition quantity.

Alternatively, a method for operating an EGR control apparatus includes executing a foreign-matter removal operation by controlling the EGR valve in order to remove foreign matters deposited on an inwall surface of the EGR passage. The method further includes detecting at least one of a deposition intensity of foreign matters deposited on the inwall surface of the EGR passage and a deposition quantity of foreign matters deposited on the inwall surface of the EGR passage. The method further includes controlling the EGR valve for regulating a flow rate of EGR gas flowing from the exhaust passage to the suction passage through the EGR passage in accordance with the at least one of the deposition intensity and the deposition quantity.

Thus, foreign matter can be efficiently removed by controlling the EGR valve in accordance with the at least one of the deposition intensity and the deposition quantity.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
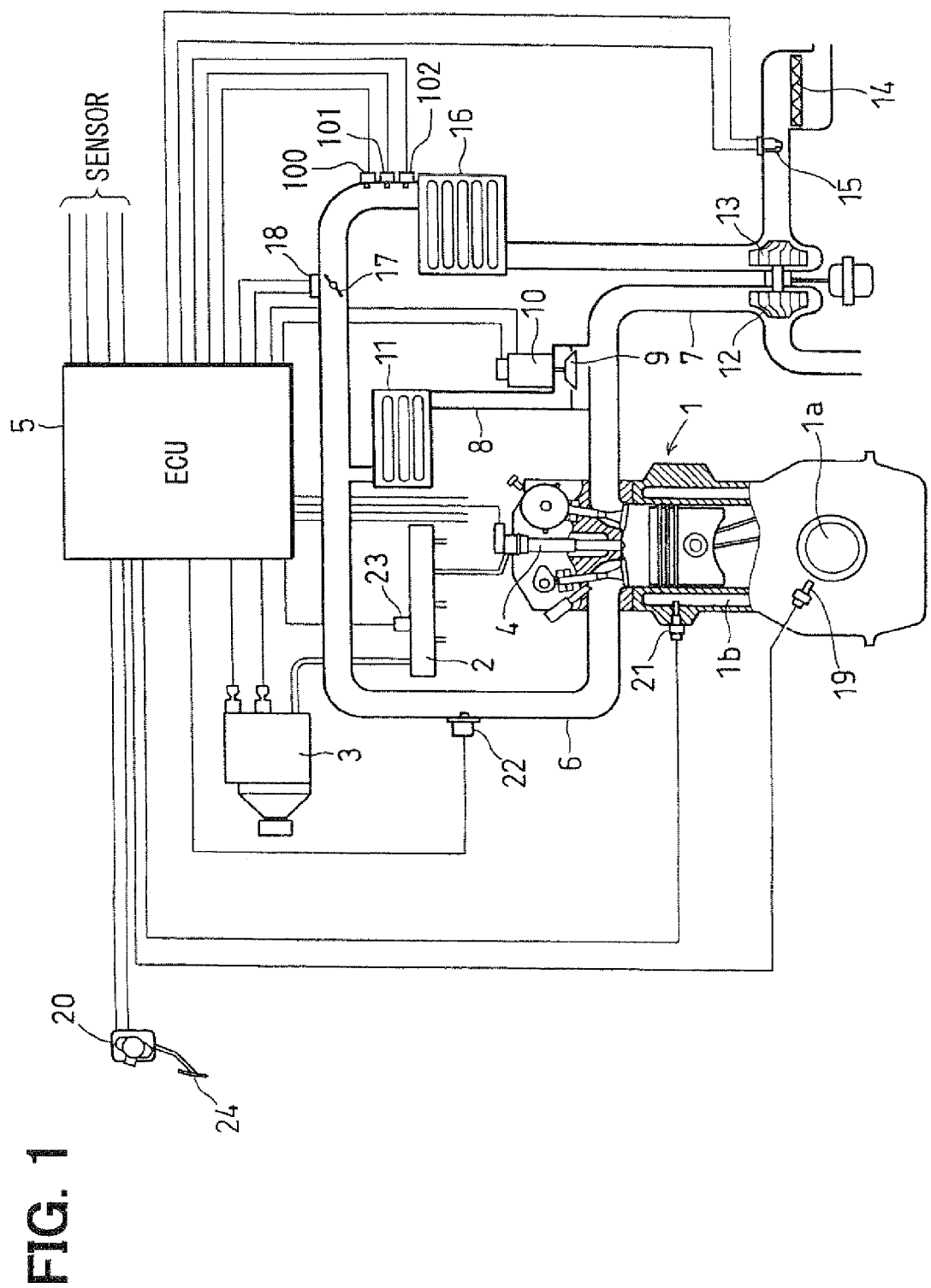
FIG. 1 is an overview showing a control system for a diesel engine, according to a first embodiment.

As shown in FIG. 1, a diesel engine 1 in this embodiment is provided with a pressure accumulation type fuel injection system (accumulator injection system), an EGR apparatus, and a turbo supercharger.

The accumulator injection system includes a common rail 2, a fuel feed pump 3, an injector 4, and the like. The common rail 2 accumulates high pressure fuel. The pressure of fuel corresponds to an injection pressure. The fuel feed pump 3 pressurizes fuel drawn from a fuel tank (not shown), and pressure-feeds the fuel into the common rail 2. The injector 4 injects the high-pressure fuel accumulated in the common rail 2 into the cylinder of the diesel engine 1. The operations of the fuel feed pump 3 and injector 4 are controlled by an electronic control unit (ECU) 5.

The EGR apparatus has a system, in which exhaust gas emitted from the diesel engine 1 is recirculated toward a suction side as EGR gas.

The EGR apparatus is constructed of an EGR passage 8, an EGR valve 9, an actuator 10, and the like. The EGR passage 8 communicates the suction passage 6 with exhaust passage 7 of the diesel engine 1. The EGR valve 9 is disposed in the EGR passage 8. The actuator 10 drives the EGR valve 9. The valve position (opening degree) of the EGR valve 9 is electronically controlled by the ECU 5 via the actuator 10 so as to produce a predetermined EGR ratio, which is set in accordance with an operating state of the diesel engine 1. The EGR valve 9 may be a piston valve, or a butterfly valve, for example.

A water-cooling EGR cooler 11 is disposed in the EGR passage 8, for example, so that the EGR gas is cooled using engine cooling water by conducting heat exchange therebetween.

The turbo supercharger is constructed of an exhaust turbine 12 and a compressor 13. The exhaust turbine 12 is disposed in the exhaust passage 7. The compressor 13 is disposed in the suction passage 6. The compressor 13 is connected coaxially with the exhaust turbine 12. The exhaust turbine 12 is rotated by receiving exhaust energy of the diesel engine 1, so that the compressor 13 is rotated to pressurize suction air. A large number of nozzle vanes (not shown) are arranged around the exhaust turbine 12, so that the turbine efficiency of the exhaust turbine 12 is altered in accordance with the position of the nozzle vanes. Thus, the compressor 13 operates a supercharged state.

An air cleaner 14 is disposed in the upper stream end of the suction passage 6 for filtering the suction air. An air flowmeter 15 is disposed on the downstream side with respect to the air cleaner 14 for measuring the quantity of the suction air. An intercooler 16 is disposed in the downstream of the compressor 13 for cooling air pressurized by the compressor 13. Further, a suction throttle valve 17 is disposed in the downstream of the intercooler 16 for adjusting the suction air quantity. The ECU 5 controls the throttle position of the suction throttle valve 17 via an actuator 18.

The ECU 5 inputs sensor signals from various sensors such as an engine speed sensor (NE sensor) 19, an accelerator position sensor 20, a water temperature sensor 21, a suction pressure sensor 22, a pressure sensor 23.

The ECU 5 controls a pressure-feed quantity of fuel, which is pumped using the fuel feed pump 3, injection timing of the injector 4, an injection quantity of the injector 4, an EGR ratio, a supercharging pressure, and the like, on the basis of the sensor signals.

The NE sensor 19 outputs multiple pulse signals, each corresponding to one revolution of the crankshaft 1*a* of the diesel engine 1. The ECU 5 measures time intervals of the pulse signals output from the NE sensor 19, thereby detecting an engine revolution speed.

The accelerator position sensor 20 detects an accelerator position corresponding to a trod amount of an accelerator pedal 24, and outputs the detection signal to the ECU 5.

The water temperature sensor 21 is constructed of a thermistor, for example. The water temperature sensor 21 detects the temperature of the cooling water flowing through a water jacket 1*b* of the diesel engine 1, and outputs the detection signal to the ECU 5.

The suction pressure sensor 22 is provided in the suction passage 6 on the downstream side of the suction throttle valve 17. The suction pressure sensor 22 detects the suction pressure (supercharging pressure), and outputs the detection signal to the ECU 5.

The pressure sensor 23 is provided in the common rail 2. The pressure sensor 23 detects the fuel pressure accumulated in the common rail 2, and outputs the detection signal to the ECU 5.

Besides, the ECU 5 has a foreign-matter removal operation programmed for performing a cleaning operation of removing foreign matters deposited on the inwall surface of the EGR passage 8. The foreign-matter removal operation is performed after an OFF manipulation of an ignition switch (IG switch) to stop the diesel engine 1, for example. Besides, the ECU 5 has a foreign-matter removal unit (removal unit) and a foreign-matter deposition detecting unit (deposition detecting unit). The removal unit performs the foreign-matter removal operation. The deposition detecting unit detects a deposition intensity of foreign matters deposited on the inwall surface of the EGR passage 8 or a deposition quantity of foreign matters deposited on the inwall surface of the EGR passage 8.

Figure 2:
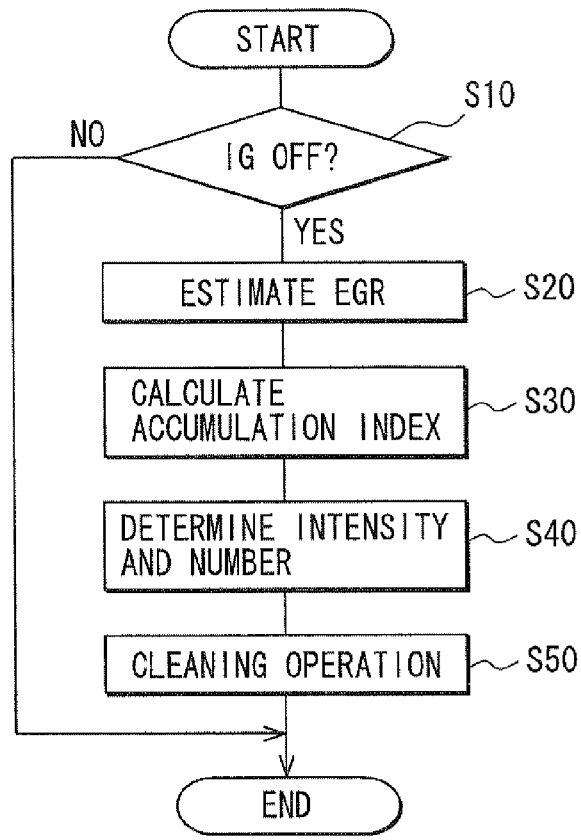
FIG. 2 is a flow chart showing a processing of a foreign-matter removal operation for the control system, according to the first embodiment.

Next, the processing of the ECU 5 is described with reference to a flow chart shown in FIG. 2.

Step S10 evaluates whether the IG switch is subjected to an OFF manipulation. When the IG switch is not subjected to the OFF manipulation, a negative determination is made in step S10, so that the routine is terminated. When a positive determination is made in step S10, the routine proceeds to step S20. The ECU 5 may delay a timing, in which a main relay (not shown) disposed in the power source line of the ECU 5 is controlled into an OFF state, after the OFF manipulation of the IG switch. That is, the ECU 5 may delay actual OFF manipulation of the IG switch.

In step S20, the ECU 5 estimates a flow rate of EGR gas. EGR gas flowing through the EGR passage 8 is regulated in accordance with the position of the EGR valve 9, so that the flow rate of EGR gas can be estimated on the basis of the position of the EGR valve 9.

Figure 3:
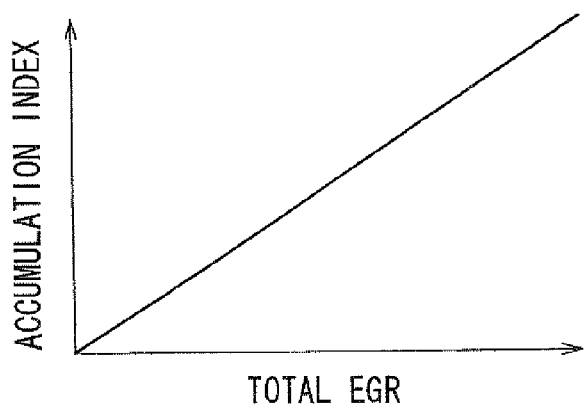
FIG. 3 is a graph showing a relationship between a total flow rate of EGR gas and a foreign-matter accumulation index, according to the first embodiment.

Step S30 calculates a foreign-matter accumulation index on the basis of the EGR gas flow rate, which is estimated in step S20. The foreign-matter accumulation index is an index for determining the deposition intensity or the deposition quantity of foreign matters deposited on the inwall surface of the EGR passage 8. The foreign-matter accumulation index is determined on the basis of a total flow rate of the EGR gas, which is a summation integrated since the previous execution of the foreign-matter removal operation until the present execution of the current foreign-matter removal operation. As shown in FIG. 3, a relationship between the foreign-matter accumulation index and the total flow rate of the EGR gas is stored in a memory of the ECU 5 for determining the foreign-matter accumulation index in accordance with the total flow rate of the EGR gas.

Figure 4:
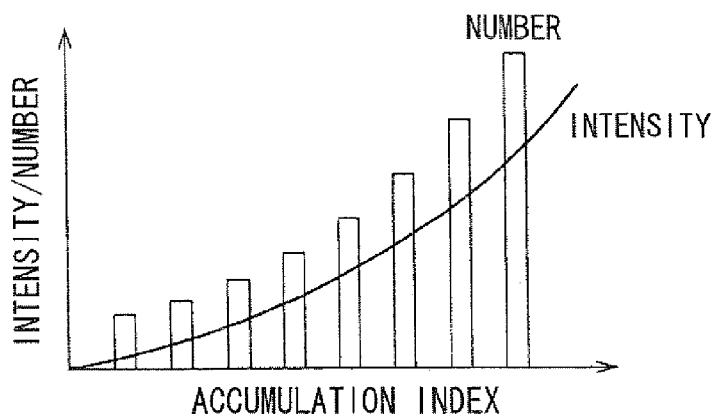
FIG. 4 is a graph showing a relationship among the foreign-matter accumulation index, intensity of actuation of an EGR valve, and a number of the actuations of an EGR valve, according to a first embodiment.

As referred to FIG. 3, in step S40 the ECU 5 determines an intensity of cleaning operations and a number of the cleaning operations on the basis of the foreign-matter accumulation index calculated in step S30. The cleaning operations are performed by operating the EGR valve 9. The intensity of the cleaning operations and the number of the cleaning operations respectively correspond to an actuation intensity of the actuator 10 for operating the EGR valve 9 and the number of the actuations of the EGR valve 9. For example, as the total flow rate of the EGR gas increases, the quantity of foreign matters contained in EGR gas correspondingly increases. As shown in FIG. 4, therefore, as the foreign-matter accumulation index becomes larger, the actuation intensity of the EGR valve 9 is set higher, and the number of the actuations of the EGR valve 9 is set larger, for example.

In step S50, the cleaning operation is performed by operating the EGR valve 9. Concretely, the ECU 5 operates the EGR valve 9 in such a manner that the ECU 5 outputs control signals to the actuator 10 on the basis of the actuation intensity and the number of the actuations, which are set in step S40.

Next, effects of this embodiment is described.

In the foreign-matter removal operation, the intensity of the actuations of the EGR valve 9 and the number of the actuations are respectively set on the basis of the foreign-matter accumulation index, so that a removal operation of foreign matters can be efficiently performed in accordance with at least one of the deposition intensity of foreign matters and the deposition quantity of foreign matters. For example, when the deposition intensity of foreign matters is high or when the deposition quantity of foreign matters is large, the foreign-matter accumulation index becomes large. Alternatively, when the deposition intensity of foreign matters is high and the deposition quantity of foreign matters is large, the foreign-matter accumulation index becomes large. When the foreign-matter accumulation index becomes large, the removal operation of foreign matters can be reliably performed by increasing the actuation intensity of the EGR valve 9 and/or increasing the number of the actuations.

when the deposition intensity of foreign matters is low and/or when the deposition quantity thereof is small, the foreign-matter accumulation index becomes small. When the foreign-matter accumulation index becomes small, the actuation intensity of the EGR valve 9 is reduced, and/or the number of the actuations is set small, whereby a wasteful energy consumption can be reduced, and noise caused by the actuations of the EGR valve 9 can be also reduced.

Second Embodiment

Figure 5:
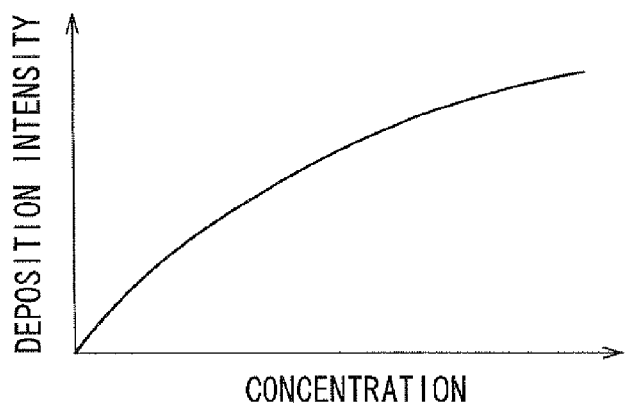
FIG. 5 is a graph showing a relationship between a concentration of foreign-matter component in EGR gas and the deposition intensity of foreign matters, according to a second embodiment.

In the second embodiment, a concentration (foreign-matter concentration) of foreign-matter component in EGR gas is used for calculating the foreign-matter accumulation index, instead of using the EGR gas flow rate. More specifically, when the foreign-matter concentration in EGR gas becomes high, the quantity of foreign matters increases in EGR gas. As shown in FIG. 5, therefore, the ECU 5 can determine that the deposition intensity of foreign matters deposited on the inwall surface of the EGR passage 8 is high. In addition, ECU 5 can determine that the deposition quantity of foreign matters increases. It is accordingly possible to calculate the foreign-matter accumulation index on the basis of the foreign-matter concentration in EGR gas on the basis of the foreign-matter accumulation index. In addition, it is accordingly possible to detect the deposition intensity and/or deposition quantity of foreign matters on the basis of the foreign-matter accumulation index.

As shown in FIG. 1, the ECU 5 may input sensor signals from other sensors such as an A/F sensor 100, an O2 sensor 101, and an exhaust temperature sensor 102. The A/F sensor 100 detects the air/fuel ratio. The O2 sensor 101 detects the oxygen concentration in the exhaust gas. The exhaust temperature sensor 102 temperature of exhaust gas emitted from the diesel engine 1.

Figure 6:
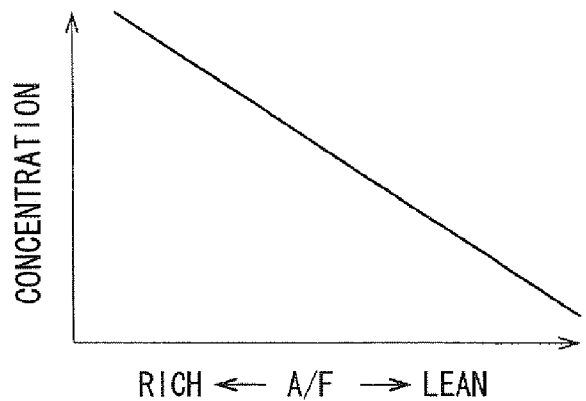
FIG. 6 is a graph showing a relationship between the concentration of foreign-matter component in EGR gas and an air/fuel ratio, according to the second embodiment.

The foreign-matter concentration in EGR gas can be estimated on the basis of the output signal of the A/F sensor 100, which detects the air/fuel ratio. More specifically, as shown in FIG. 6, it can be determined that, as the air/fuel ratio becomes smaller to be in a fuel-rich condition, the quantity of foreign matters contained in exhaust gas becomes larger, so that the foreign-matter concentration in EGR gas becomes higher. Therefore, the foreign-matter concentration in EGR gas can be estimated on the basis of the output signal of the A/F sensor 100. It is also possible to use the O2 sensor 101, which detects the oxygen concentration in the exhaust gas. More specifically, when the air/fuel ratio becomes smaller to be in the fuel-rich condition, the oxygen concentration in the exhaust gas becomes lower. By contrast, when the air/fuel ratio becomes larger to be in a fuel-lean condition, the oxygen concentration in the exhaust gas becomes higher. Since the air/fuel ratio and the oxygen concentration in the exhaust gas correlate in this manner, the foreign-matter concentration in EGR gas can be estimated on the basis of the output signal of the O2 sensor 101.

When the foreign-matter accumulation index is calculated by the method described in the first embodiment, that is, on the basis of the EGR gas flow rate, which is the estimated value, this foreign-matter accumulation index can be corrected with the foreign-matter concentration in EGR gas. In this case, the foreign-matter accumulation index can be calculated in consideration of, not only the EGR gas flow rate, but also the foreign-matter concentration in EGR gas. Thus, the deposition intensity and/or deposition quantity of foreign matters can be further precisely detected.

Third Embodiment

This embodiment is an example in which the ECU 5 corrects the foreign-matter accumulation index calculated by the method described in the first or the second embodiment on the basis of temperature of EGR gas.

Foreign matters contained in EGR gas are further deposited on the inwall surface of the EGR passage 8 when the EGR gas condenses Therefore, the deposition intensity and/or deposition quantity of foreign matters can be further precisely detected by correcting the foreign-matter accumulation index in accordance with the temperature (EGR gas temperature) of the EGR gas.

The EGR gas temperature can be estimated on the basis of the output signal of the exhaust temperature sensor 102, which detects temperature of exhaust gas emitted from the diesel engine 1. More specifically, EGR gas is a part of exhaust gas emitted from the diesel engine 1, and is recirculated from the exhaust passage 7 into the suction passage 6 through the EGR passage 8. Therefore, the EGR gas temperature can be estimated by detecting the temperature of the exhaust gas.

Figure 7:
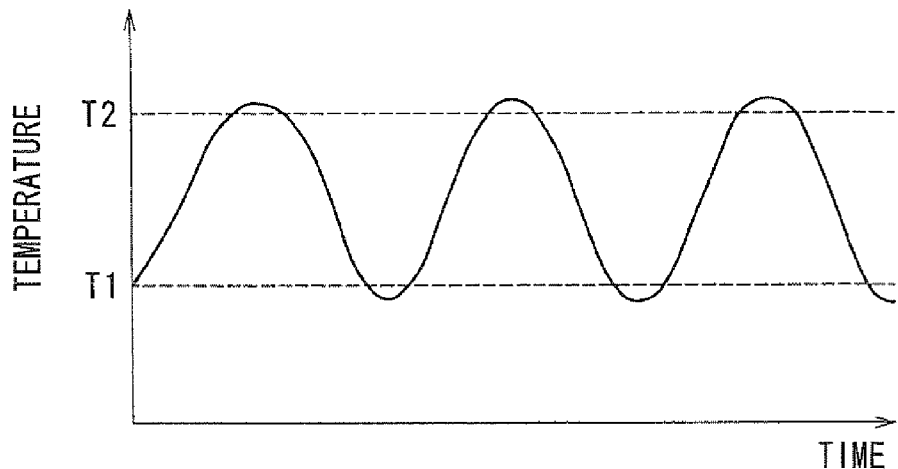
FIG. 7 is a graph showing a variation in temperature of an EGR gas, according to a third embodiment.

As shown in FIG. 7, the ECU 5 sets a first threshold T1, which is the condensation temperature of the EGR gas, and a second threshold T2, which is a predetermined temperature higher than the first threshold T1. The ECU 5 counts the number of conditions, in which the EGR gas temperature increases to be equal to or greater than the second threshold T2 and thereafter decreases to be equal to or less than the first threshold T1, so that the ECU 5 corrects the foreign-matter accumulation index in accordance with the count value of the condensations of the EGR gas.

As the number of the condensations of the EGR gas increases, the quantity of foreign matters deposited on the inwall surface of the EGR passage 8 becomes larger. Therefore, the deposition intensity and/or the deposition quantity of foreign matters can be further precisely detected by correcting the foreign-matter accumulation index in accordance with the number of the condensations of the EGR gas. The number of the condensations of the EGR gas substantially correspond to the number of conditions, in which the EGR gas temperature increases to be equal to or greater than the second threshold T2 and thereafter decreases to be equal to or less than the first threshold T1.

Fourth Embodiment

Figure 8:
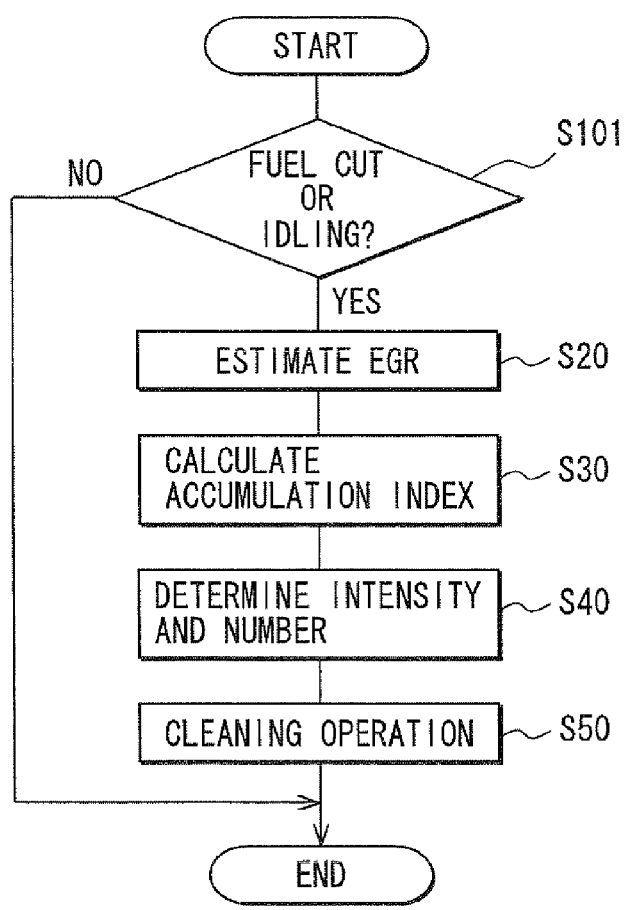
FIG. 8 is a flow chart showing a processing of a foreign-matter removal operation for the control system, according to a fourth embodiment.

In the first embodiment, the foreign-matter removal operation is performed after the OFF manipulation of the IG switch Alternatively, however, the foreign-matter removal operation can be performed in specific conditions such as a deceleration fuel cut mode, in which fluctuation in the position of the EGR valve 9 exerts small influences to the running state of the diesel engine 1, and an idling mode, in which a cruising state is not exerted influence by the cleaning operation. As shown in FIG. 8, in step S101, the ECU 5 evaluates whether the present condition is in a deceleration fuel cut mode or an idling mode. When the present condition is in neither a deceleration fuel cut mode nor an idling mode, a negative determination is made in step S101, so that the routine is terminated. When a positive determination is made in step S101, the routine proceeds to step S20. Processing other than step 101 is substantially equivalent to the processing shown in FIG. 2 described in the first embodiment.

The first embodiment has mentioned the example in which the invention is applied to the diesel engine 1. However, the invention is also applicable to a gasoline engine provided with an EGR apparatus.

The location of the sensors such as A/F sensor 100, the O2 sensor 101, and the exhaust temperature sensor 102 are not limited to those depicted in the above embodiments.

The above structures of the embodiments can be combined as appropriate.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. An EGR control apparatus for an internal combustion engine having a suction passage, an exhaust passage, and an EGR passage, the EGR passage connecting the suction passage with exhaust passage, the EGR control apparatus comprising:
    an EGR valve that is disposed in the EGR passage for regulating a flow rate of EGR gas flowing from the exhaust passage to the suction passage through the EGR passage; and
    a control unit that includes a removal unit, which is adapted to executing a foreign-matter removal operation by controlling the EGR valve in order to remove foreign matters deposited on an inwall surface of the EGR passage,
    wherein the control unit further includes a deposition detecting unit that detects at least one of a deposition intensity of foreign matters deposited on the inwall surface of the EGR passage and a deposition quantity of foreign matters deposited on the inwall surface of the EGR passage, and
    the removal unit controls the EGR valve in accordance with the at least one of the deposition intensity and the deposition quantity;
    wherein the deposition detecting unit estimates at least one of the flow rate of EGR gas and a foreign-matter concentration in EGR gas after the removal unit executes a previous foreign-matter removal operation,
    the deposition detecting unit calculates a foreign-matter accumulation index in accordance with the at least one of the flow rate of EGR gas and the foreign-matter concentration in EGR gas, and
    the deposition detecting unit detects at least one of the deposition intensity and the deposition quantity in accordance with the foreign-matter accumulation index.

2. The EGR control apparatus according to claim 1, wherein the removal unit executes the foreign-matter removal operation in at least one of the following conditions,
    when an OFF manipulation of an ignition switch is performed for stopping the internal combustion engine;
    when the internal combustion engine is in a deceleration fuel cut mode;
    when the internal combustion engine is in an idling mode; and
    when variation in a position of the EGR valve exerts small influences to an operation of the internal combustion engine.

3. The EGR control apparatus according to claim 1, wherein the deposition detecting unit estimates the EGR gas flow rate in accordance with a position of the EGR valve.

4. The EGR control apparatus according to claim 1, further comprising:
    at least one sensor that detects at least one of an air/fuel ratio of exhaust gas and an oxygen concentration in exhaust gas,
    wherein the deposition detecting unit estimates the foreign-matter concentration in EGR gas in accordance with the at least one of the air/fuel ratio and the oxygen concentration.

5. The EGR control apparatus according to claim 4,
    wherein the at least one sensor includes at least one of an A/F sensor and an O2 sensor,
    the A/F sensor detects the air/fuel ratio, and
    the O2 sensor detects the oxygen concentration.

6. The EGR control apparatus according to claim 1, wherein the deposition detecting unit corrects the foreign-matter accumulation index in accordance with temperature of EGR gas.

7. The EGR control apparatus according to claim 6, further comprising:
    an exhaust temperature sensor that detects temperature of exhaust gas emitted from the internal combustion engine,
    wherein the deposition detecting unit estimates the temperature of EGR gas in accordance with the temperature of exhaust gas.

8. The EGR control apparatus according to claim 6,
    wherein the deposition detecting unit sets a first threshold and a second threshold,
    the first threshold is substantially equal to a condensation temperature of EGR gas,
    the second threshold is greater than the first threshold,
    the deposition detecting unit corrects the foreign-matter accumulation index in accordance with a number of conditions, in which the temperature of EGR gas increases to be equal to or greater than the second threshold and thereafter decreases to be equal to or less than the first threshold.

9. A method for operating an EGR control apparatus, said method comprising:
  executing a foreign-matter removal operation by controlling the EGR valve in order to remove foreign matters deposited on an inwall surface of the EGR passage;
  detecting at least one of a deposition intensity of foreign matters deposited on the inwall surface of the EGR passage and a deposition quantity of foreign matters deposited on the inwall surface of the EGR passage;
  controlling the EGR valve for regulating a flow rate of EGR gas flowing from the exhaust passage to the suction passage through the EGR passage in accordance with the at least one of the deposition intensity and the deposition quantity;
  estimating at least one of the flow rate of EGR gas and a foreign-matter concentration in EGR gas after executing a previous foreign-matter removal operation;
  calculating a foreign-matter accumulation index in accordance with the at least one of the flow rate of EGR gas and the foreign-matter concentration in EGR gas; and
  detecting at least one of the deposition intensity and the deposition quantity in accordance with the foreign-matter accumulation index.

10. The method according to claim 9,
  wherein the foreign-matter removal operation is executed in at least one of the following conditions:
  when an OFF manipulation of an ignition switch is performed for stopping the internal combustion engine;
  when the internal combustion engine is in a deceleration fuel cut mode;
  when the internal combustion engine is in an idling mode; and
  when variation in a position of the EGR valve exerts small influences to an operation of the internal combustion engine.

11. The method according to claim 9, wherein the EGR gas flow rate is estimated in accordance with a position of the EGR valve.

12. The method according to claim 9, further comprising:
  detecting at least one of an air/fuel ratio of exhaust gas and an oxygen concentration in exhaust gas,
  wherein the foreign-matter concentration in EGR gas is estimated in accordance with the at least one of the air/fuel ratio and the oxygen concentration.

13. The method according to claim 9, further comprising:
  correcting the foreign-matter accumulation index in accordance with temperature of EGR gas.

14. The method according to claim 13, further comprising:
  detecting temperature of exhaust gas emitted from the internal combustion engine; and
  estimating the temperature of EGR gas in accordance with the temperature of exhaust gas.

15. The method according to claim 13, further comprising:
  setting a first threshold to be substantially equal to a condensation temperature of EGR gas;
  setting a second threshold to be greater than the first threshold;
  counting a number of conditions, in which the temperature of EGR gas increases to be equal to or greater than the second threshold and thereafter decreases to be equal to or less than the first threshold; and
  correcting the foreign-matter accumulation index in accordance with the number of conditions.

* * * * *